(12) United States Patent
Sun

(10) Patent No.: US 8,931,851 B2
(45) Date of Patent: Jan. 13, 2015

(54) SEAT BELT ADJUSTER

(76) Inventor: Yingui Sun, Beijing (CN)

( * ) Notice: Subject to any disclaimer, the term of this patent is extended or adjusted under 35 U.S.C. 154(b) by 0 days.

(21) Appl. No.: 13/819,078

(22) PCT Filed: Aug. 26, 2011

(86) PCT No.: PCT/CN2011/079005
§ 371 (c)(1),
(2), (4) Date: May 8, 2013

(87) PCT Pub. No.: WO2012/025062
PCT Pub. Date: Mar. 1, 2012

(65) Prior Publication Data
US 2013/0214584 A1    Aug. 22, 2013

(30) Foreign Application Priority Data

Aug. 27, 2010 (CN) .......................... 2010 1 0264551

(51) Int. Cl.
*B60R 22/185* (2006.01)
*B60R 22/00* (2006.01)
*B60R 22/19* (2006.01)

(52) U.S. Cl.
CPC ............... *B60R 22/00* (2013.01); *B60R 22/185* (2013.01); *B60R 22/19* (2013.01)
USPC .......................................... 297/480; 280/806

(58) Field of Classification Search
CPC .. B60R 22/185; B60R 22/1855; B60R 22/19; B60R 22/195; B60R 22/1951; B60R 22/1958; B60R 22/24
USPC ........ 242/382, 382.5, 382.6, 383, 383.2–384, 242/384.2–384.6; 280/801.2, 806; 297/479, 297/480
See application file for complete search history.

(56) References Cited

U.S. PATENT DOCUMENTS 3,237,729 A * 3/1966 Proctor .......................... 188/136
3,372,777 A * 3/1968 Filippi et al. .................. 188/136
(Continued)

FOREIGN PATENT DOCUMENTS

CN     1088167 A    6/1994
CN     2728855 Y    9/2005
(Continued)

OTHER PUBLICATIONS

International Search Report for PCT/CN2011/079005, date of mailing Dec. 8, 2011.
(Continued)

*Primary Examiner* — Paul N Dickson
*Assistant Examiner* — Laura Freedman
(74) *Attorney, Agent, or Firm* — Dickstein Shapiro LLP

(57) ABSTRACT

The present invention provides a seat belt adjuster applicable to seat belts in vehicles, comprising: a pair of supporting swing rods composed of a first swing rod and a second swing rod, with the adjacent ends of the first and second swing rods hinged together and forming an included angle between the swing rods, either non-adjacent end of the first and second swing rods fixed in stationary state, and the other non-adjacent end of the first and second swing rods movable as the included angle between the swing rods changes; and an actuator, which changes the included angle between the swing rods by exerting force to the first swing rod and/or the second swing rod and/or the hinge point of the swing rods, and thereby directly applies variable force on the strap of the seat strap via the other non-adjacent end.

7 Claims, 18 Drawing Sheets

(56) References Cited

U.S. PATENT DOCUMENTS

| | | | |
|---|---|---|---|
| 4,545,546 A | | 10/1985 | Kawaguchi et al. |
| 4,718,148 A | * | 1/1988 | McKernon et al. ............ 24/170 |
| 4,747,617 A | * | 5/1988 | Magyar et al. ............... 280/808 |
| 4,768,809 A | | 9/1988 | Andersson et al. |
| 4,792,158 A | * | 12/1988 | Andersson .................. 280/806 |
| 4,923,214 A | * | 5/1990 | Siegrist et al. .............. 280/806 |
| 4,958,854 A | * | 9/1990 | Haland ......................... 280/806 |
| 4,999,004 A | | 3/1991 | Skanberg et al. |
| 5,004,178 A | * | 4/1991 | Kobayashi et al. ........ 242/381.1 |
| 5,186,063 A | * | 2/1993 | Nishizawa ......................... 74/2 |
| 5,328,118 A | | 7/1994 | Tokugawa et al. |
| 5,346,152 A | * | 9/1994 | Fohl .............................. 242/371 |
| 5,377,554 A | | 1/1995 | Reulein et al. |
| 5,503,037 A | * | 4/1996 | Ruelein et al. ..................... 74/2 |
| 2007/0069060 A1 | * | 3/2007 | Maciejczyk .............. 242/381.1 |
| 2009/0222171 A1 | | 9/2009 | Jabusch |

FOREIGN PATENT DOCUMENTS

| | | | | |
|---|---|---|---|---|
| CN | 201304958 Y | | 9/2009 | |
| DE | 39 37 883 A1 | | 5/1990 | |
| DE | 3923724 A1 | * | 1/1991 | ............ B60R 22/18 |
| EP | 61825 A2 | * | 10/1982 | ............ B60R 21/10 |
| GB | 2 237 180 A | | 5/1991 | |
| GB | 2 263 387 A | | 7/1993 | |
| GB | 2294866 A | | 5/1996 | |
| JP | H05-501838 A | | 4/1983 | |
| JP | S61-47755 U | | 3/1986 | |
| JP | H02-256550 A | | 10/1990 | |
| JP | 5-124487 A | | 5/1993 | |
| JP | 2000-355265 A | | 12/2000 | |
| RU | 2 377 146 C2 | | 12/2009 | |

OTHER PUBLICATIONS

Notice of Allowance issued for corresponding Japanese Application No. 2013-526305, issued on Jul. 22, 2014 (with English translation).
Notice of Allowance issued for corresponding Russian Application No. 2013113584/11(020069), issued Apr. 25, 2014 (with English translation).
Canadian Office Action issued for corresponding Canadian Application No. 2,808,340, issued Jun. 13, 2014.
Chinese Second Office Action issued for corresponding Chinese Application No. 2010102645510, issued on Aug. 13, 2013 (with English translation).
Chinese Third Office Action issued for corresponding Chinese Application No. 2010102645510, issued on Jun. 26, 2014 (with English translation).
Korean Office Action issued for corresponding Korean Patent Application No. 10-2013-7004699, issued on Jul. 18, 2014 (with English translation).
Chinese Rejection Decision issued for corresponding Chinese Application No. 201180004091.0, issued on Feb. 26, 2014 (with English translation).
Japanese Office Action issued for corresponding Japanese Application No. 2013-526305, issued Jan. 21, 2014 (with English translation).
European Search Report issued for corresponding EP Application No. 11 81 9437, issued Jan. 10, 2013.

* cited by examiner

SEAT BELT ADJUSTER

FIELD OF THE INVENTION

The present invention relates to a seat belt adjuster applicable to seat belts in vehicles, which can be used to adjust the degree of locking or retraction of seat belt in different situations, including normal use, emergency braking, and retraction after use.

BACKGROUND OF THE INVENTION

Passive safety of vehicles refers to the performance of protection for occupants in case of accidents. In terms of automobiles, safety belts and air bags are fittings that are of great concern to the public for passive safety. However, the safety protection effect of air bags will be severely compromised and the occupant may even be injured when the air bags are released, if the seat belt is not fastened up correctly.

Seat belts used in automobiles are usually a sort of seat belts that will be locked up in case of emergencies. Before use, the seat belt can be pulled out easily. In the normally driving process, the seat belt retractor in the automobile exerts weak spring retraction force to hold the seat belt in position, and doesn't cause a sense of excessive pressure on the occupant. However, in the event of any crash and severe sway, the locking device will seize and lock up the seat belt immediately, to prevent the seat belt from pulled out further.

Nowadays, a sort of pre-tensioner restraining seat belts have been developed, which can tension up the seat belt further so as to effectively restrain the body of the occupant in the event of crash.

At present, many pre-tensioner seat belts employ a pyrotechnic principle, i.e., the so called "pyrotechnic seat belts". The retractor of a pyrotechnic seat belt has a set of pyrotechnic means, which, when initiated, drives the retractor to rotate with blasting energy, and thereby attains a tensioning effect. Such a seat belt is usually used in combination with air bags. Usually, such a pre-tensioner seat belt has two functioning principles: it has the same function as conventional seat belts during light collision or hard braking. That is to say, when the seat belt is pulled quickly by force, the retractor will lock up, but will not initiate the pyrotechnic means. In that sense, the pyrotechnic means will function only when the collision reaches to a certain degree of severity. Moreover, the pyrotechnic means is of one-off type, which means it has to be replaced in a repair shop after it is initiated.

In a pyrotechnic seat belt apparatus, a gas generator is essential. In addition, the use of high pressure gas implicates that appropriate material and structure have to be used to ensure enough strength and leak-tightness during use. Moreover, a pre-tensioner seat belt will generate pretension force in the event of a crash, which is preset in the manufacturing process, and can't be adjusted to adapt to the body type of a specific occupant. Therefore, the safety protection performance of such a pre-tensioner seat belt apparatus is not satisfactory enough. In addition, such an apparatus must be integrated into the retractor, so as to apply the kinetic energy directly on the roller shaft for the seat belt. Hence, such an apparatus has drawbacks such as large size, complex design, high cost, and adjusting inconvenience, etc.

Some vehicles are fitted with a pre-crash safety system, which has a pre-tensioning function provided by an electro-dynamic mechanism. Thus, in such a pre-crash safety system, the seat belt can be reused. Of course, the number of reuse cycles is limited. If the limit is exceeded, the entire pre-crash safety system, including the pre-tensioner seat belt, has to be replaced. Though such a pre-crash safety system is reusable, it is difficult to replace. Moreover, since the system has to be controlled electronically, it also has drawbacks such as complex structure, inconvenience in replacement, high cost, low reliability, and poor applicability, etc.

In Patent Document No. GB2294866, a pre-tensioning apparatus that utilizes inertia for mechanical control is disclosed. The working principle of that apparatus is as follows: as shown in FIG. 17, in the normally driving state, an actuating rod 16 is not engaged with a mass block 17 firmly, but is engaged with a seat belt supporting member 47 instead; the seat belt supporting member 47 is wedged to a belt buckle 53 of the strap S of the seat belt, as shown in FIG. 17. In case the deceleration exceeds a preset safety limit, the mass block 17 will move forwards under inertial effect, and consequently the actuating rod 16 engages the mass block 17 in a concave-convex engaging manner and disengages from the seat belt supporting member 47, so that the seat belt supporting member 47 drives the strap S to move downwards and backwards in direction F, and thereby tensions up and restrains the seat belt at a restrained position.

The tensioning force provided by such a mechanical pre-tensioning apparatus depends on the arc length of a slot 30. To achieve higher tensioning force, the arc length of the slot 30 must be longer. As a result, the entire assembly will inevitably occupy a large space. Moreover, the longer the arc length of the slot 30 is, the longer the response time of the entire assembly will be, which implicates higher possibility of occupant injury at the moment of crash. In addition, since the pre-tensioning apparatus actuates the tensioning process by means of engagement between the actuating rod 16 and the mass block 17 and simultaneous disengagement of the actuating rod 16 from the seat belt supporting member 47, a serious consequence of malfunction of the pre-tensioning apparatus may occur if either of engagement/disengagement fails. Therefore, the service reliability of such a pre-tensioning apparatus is limited. To improve reliability, additional cost in design and manufacturing is required, causing degraded economic efficiency.

Another pre-tensioning apparatus is disclosed in Patent Document No. U.S. Pat. No. 4,768,809. In that pre-tensioning apparatus, a structure composed of two swing rods with adjacent ends hinged together are utilized to actuate the tensioning of the seat belt and restrain the seat belt at a restrained position. However, that structure has a common feature with the structure disclosed in GB2294866, i.e., it also utilizes an arc-shaped guide slot to guide the tensioning of the seat belt. Therefore, that structure also have the above-mentioned drawbacks, i.e., the tensioning force is limited by the guide slot structure and a large space is occupied.

Hence, it is desirable to provide a seat belt without the above-mentioned drawbacks. The seat belt should be able to exert appropriate and almost zero restraining force on the occupant so as to enable the occupant to act comfortably and move freely under essentially zero pressure of the seat belt in normally driving state, but can tension up the seat belt timely in case of any emergent or catastrophic event, and can release the seat belt automatically after the event. Moreover, the seat belt should have advantages such as simple structure, high reliability, easy replacement and adjustment, low cost, and wide applicability, etc.

SUMMARY OF THE INVENTION

The object of the present invention is to provide a seat belt as described above, which can be used to adjust the degree of locking and retraction of the seat belt in different situations, including normal use, emergency braking, and retraction after use, etc.

The present invention provides a seat belt adjuster applicable to seat belts in vehicles, comprising: a pair of supporting swing rods composed of a first swing rod and a second swing rod, with the adjacent ends of the first and second swing rods hinged together and forming an included angle between the swing rods, either non-adjacent end of the first and second swing rods fixed in a stationary state, and the other non-adjacent end movable as the included angle between the swing rods changes; and an actuator, which changes the included angle between the swing rods by exerting force on the first swing rod and/or the second swing rod and/or the hinge point of the swing rods, and thereby directly applies variable force on the strap of the seat belt via the other non-adjacent end, wherein, when the first and the second swing rods are in a 180-degree vertically aligned state, the other non-adjacent end can provide full supporting force perpendicularly on the strap of the seat belt, and thereby to lock the strap of the seat belt to restrain it from moving, and, when the included angle between the swing rods is changed via the actuator under the action of small signaling force, the other non-adjacent end can release the strap of the seat belt; or, when the first and second swing rods are in a 180-degree vertically aligned state, the other non-adjacent end can release the strap of the seat belt to move, and, when the included angle between the swing rods is changed via the actuator under the action of small signaling force, the other non-adjacent end can provide full supporting force perpendicularly on the strap of the seat belt, and thereby lock the strap of the seat belt to restrain the strap of the seat belt from moving.

Preferably, once the deceleration exceeds a preset safety limit, the other non-adjacent end will automatically lock the strap of the seat belt to restrain it from moving, in order to protect the occupant.

Preferably, once the deceleration exceeds a preset safety limit, the other non-adjacent end will automatically unlock the strap of the seat belt, so that a seat belt retractor can tension up the strap of the seat belt further and thereby restrain the occupant in the seat.

Preferably, during normal use, the other non-adjacent end locks up the strap of the seat belt in a position of required pull-out length.

Preferably, the actuator exerts force on the hinge point of the swing rods.

Preferably, the seat belt comprises a suspender that is suspended on a supporting pillar and designed to fix the upper end of the strap of the seat belt nearby a shoulder of the occupant, and a retractor that is arranged near the lower part of the seat at a side of the seat and designed to retract the strap of the seat belt inwards; the adjuster is arranged at any position between the suspended and the retractor, so as to act directly on the strap of the seat belt.

Preferably, the actuator comprises a mass object, and changes the included angle between the swing rods automatically under the inertial effect of the mass object.

Preferably, the actuator comprises an electro-dynamic component, which is designed to change the included angle between the swing rods automatically in response to a control signal.

Preferably, the adjuster further comprises a sensing component, which is designed to sense any angular change of the strap of the seat belt resulted from tension change of the strap of the seat belt, and thereby adjust the included angle between the swing rods.

BRIEF DESCRIPTION OF THE DRAWINGS

FIGS. 1A and 2A show that the supporting swing rods are in a vertical critical supporting state in the situation of normal use; FIGS. 2A and 2B show that the supporting swing rod 2 bends at the hinge point between the two swing rods when it is impacted by the mass object when the mass object is triggered in an emergent situation.

BRIEF DESCRIPTION OF THE SYMBOLS

1—hinged knuckle point, a1—knuckle point of supporting swing rods, 2—supporting swing rod, 3—mass object, 4—link bar between mass object and hinged knuckle, 5—sensitivity adjustment of supporting swing rods triggered by changing the relative horizontal angle of the mass object, 6—metal ball movable in a tunnel, 7—metal ball movement tunnel, 8—space for sliding up and down, 9—retraction triggering block triggered after the seat belt is used, 10—interlock rod, 11—guide rod, 12—eccentric roller, 13—retraction-restraining press block, 14—eccentric roller shaft, 15—supporting reed, 16—movable bracket, 17—shaft rod, 18—connecting snap spring retainer, 19—suspension snap spring, 20—angle-adjustable soleplate, 21—positioning spring, 22—angle-adjustable centering screw, 23—positioning ratchet reed, 24—positioning ratchet, 25—suspension frame, 26—frame seat, 27—electric micro-switch, 28—switch contact, 29—interlock rod contact.

101—connection point, a101—knuckle point of supporting swing rods, 102—supporting swing rod, 103—mass object, 105—slide slotted hole for sensitivity adjustment, 112—eccentric roller, 114—eccentric roller shaft, 116—adjustable suspension frame seat, 121—return spring, 123—ratchet stop boss, 124—ratchet, 125—suspension frame, 130—suspension shaft, 132—seat belt pull-through clearance, 133—angle sensing rod, 136—contact on mass object, 138—bulged part of angle sensing rod, 139—limiting tab on mass object, 143—frame of seat belt suspender, 148—upper cover, 150—seat belt suspender connecting hole.

DETAILED DESCRIPTION OF THE EMBODIMENTS

To make the object, technical solutions, and advantages of the embodiments of the present invention understood more clearly, hereunder the technical solutions in the embodiments of the present invention will be detailed clearly and completely, with reference to the accompanying drawings in the embodiments of the present invention.

Figure 18:
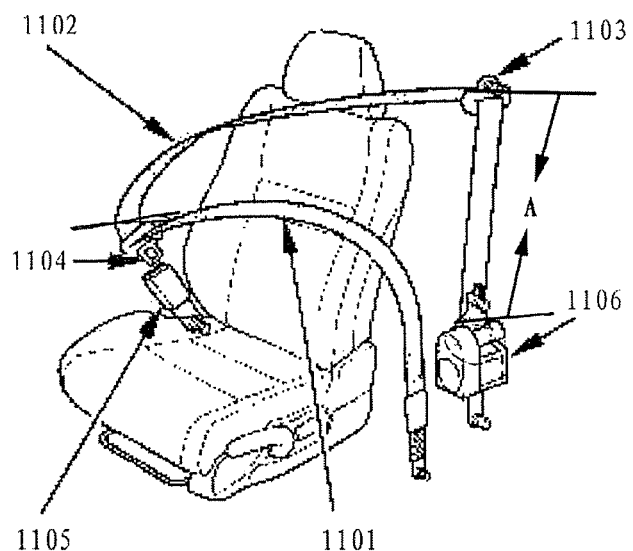
FIG. 18 shows the deployment of the seat belt adjuster in the present invention in a vehicle.

As shown in FIG. 18, a seat belt to which the seat belt adjuster in the present invention is applicable comprises: a strap consisting of a waist belt 1101 and a shoulder belt 1102; a suspender 1103 fixed to the upper part of vehicle body near a shoulder of the occupant; a knuckle lock unit consisting of a locking bolt 1104 and a locking body 1105, fixed to the lower part of vehicle body at one side of the seat; and a lower fixing unit 1106 fixed to the lower part of vehicle body at the other side of the seat, with a seat belt retractor integrated in the lower fixing unit 1106.

In use, the seat belt transits between a locked state and a released state. On that basis, the seat belt adjuster provided in the present invention adjusts the seat belt mechanically between the two states.

Specifically, the present invention employs supporting rods for supporting purpose, and thereby can provide great restraining force on the seat belt, and can release the restrainment on the seat belt under the action of small signaling force. Such a great force-small force contrast is of great importance for seat belt apparatuses that must have high safety and high reliability performance.

The present invention can be applied in a variety of ways.

In one aspect, the present invention can be applied as a pre-tensioner, which restrains the seat belt from retracting and keeps the seat belt comfortable to the occupant during normal use, and releases the restrainment on the seat belt so that the seat belt can be retracted by a retractor in the event of vehement deceleration.

Or reversely, the present invention can be applied as an ordinary locking apparatus, which doesn't restrain the seat belt during normal use, but locks up the seat belt to prevent the seat belt from pulled out in the event of any emergency.

FIGS. 1A-1B and 2A-2B are schematic diagrams illustrating the working principle of the seat belt adjuster in the present invention. As shown in FIG. 1, in the present invention, four supporting swing rods 2 are provided, and are hinged together on the top, bottom, left, and right, forming a parallelogrammic link mechanism in the same plane. Specifically, the four supporting swing rods 2 are arranged in pairs on the left and right respectively; wherein, the two supporting swing rods 2 on the left or right are aligned vertically, with adjacent ends hinged together to form a hinged knuckle point a1, while the free ends of the two pairs of supporting swing rods 2 on the left and right are connected together by upper and lower supporting rods L1. In that way, four connection points 1 (top, bottom, left, and right) are created, and a parallelogrammic link mechanism is formed.

Figure 1:
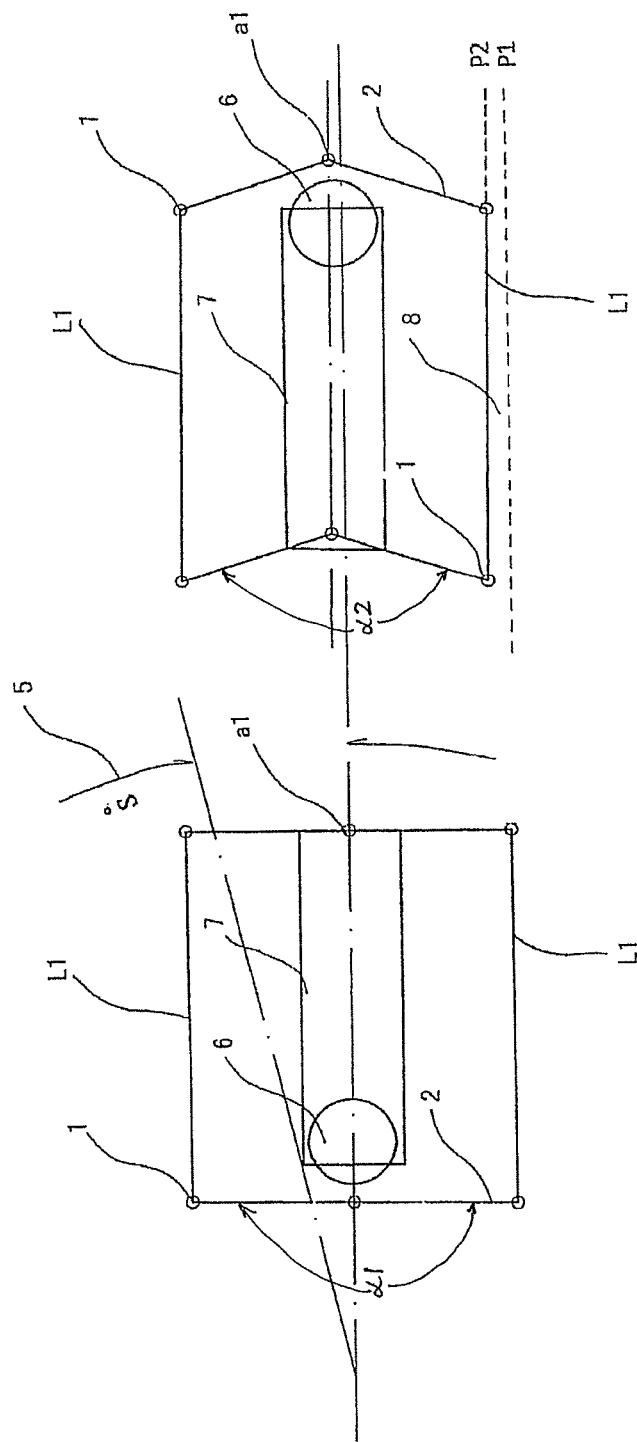
FIGS. 1A-1B and 2A-2B are schematic diagrams illustrating the working principle of the seat belt adjuster disclosed in the present invention, wherein, the hinged knuckle point of swing rods is actuated under the inertial effect of the mass object.
Figure 2:
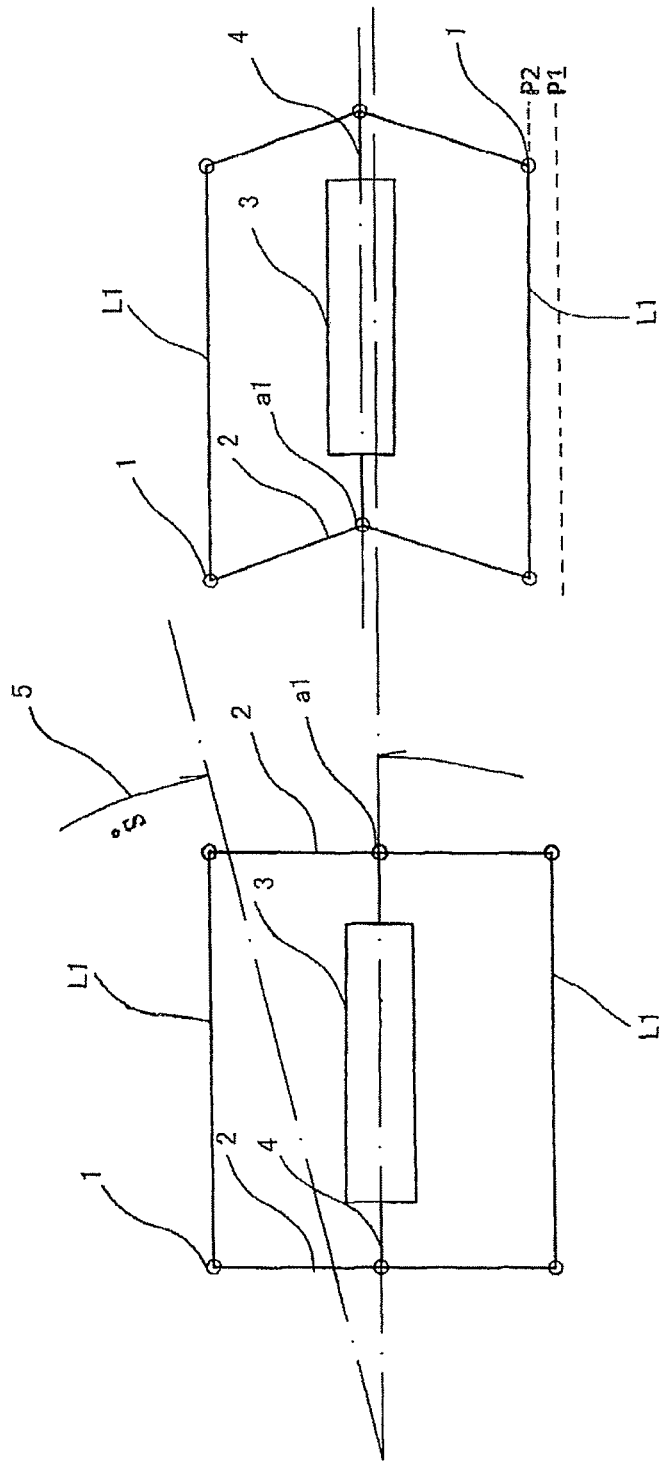
Figure 3:
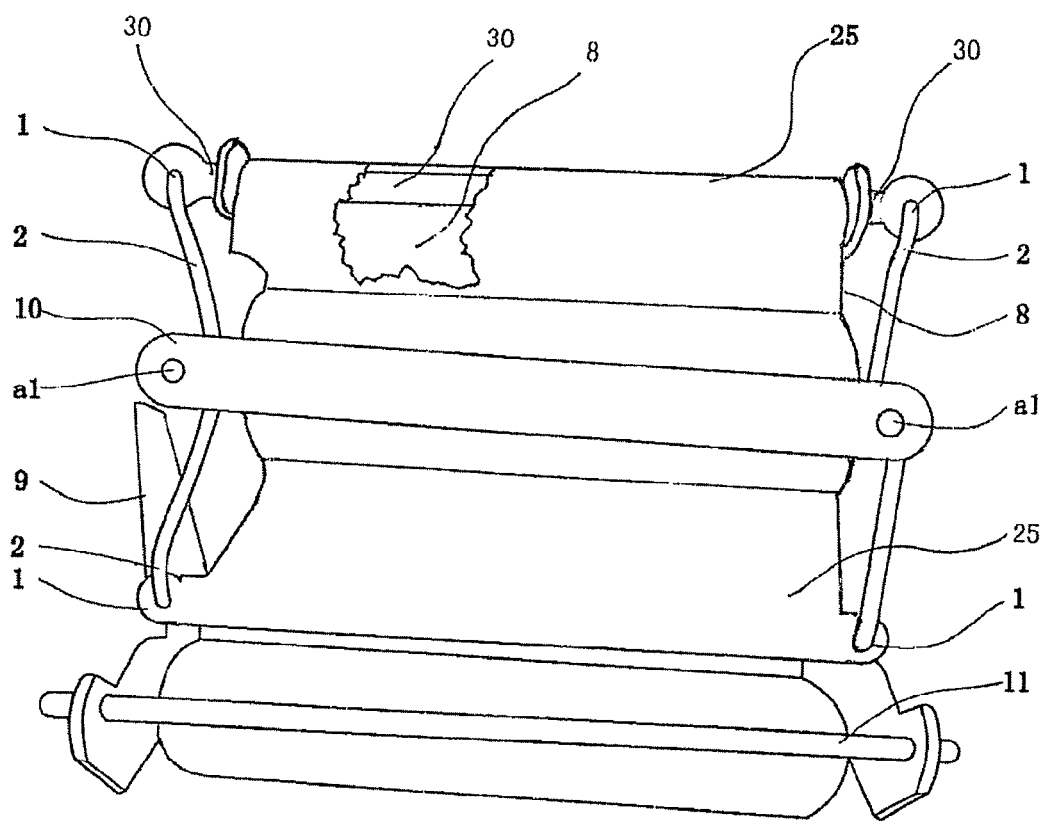
FIG. 3 is a schematic structural diagram of the adjuster in a first embodiment of the invention, in a state that the adjuster restrains the seat belt from retracting in the normal driving situation.

FIG. 1 is essentially the same as FIG. 2, with the difference lying in: the mass object 6 in FIG. 1 is a ball, which can roll in a movable channel 7; whereas the mass object 3 in FIG. 2 is a mass block, which is connected to the hinged knuckle point a1 via a link bar.

FIG. 1A shows the two pairs of supporting swing rods 2 in a "vertical critical state". That is to say, the upper and lower supporting swing rods 2 on the same side are essentially aligned to each other in the vertical direction, forming a first included angle $\alpha 1$ essentially equal to 180°, and thus the lower end of the supporting swing rods 2 is at position P1.

The 180° included angle can be maintained in a variety of ways. In this embodiment, a supporting part (not shown) is arranged at the hinged knuckle point a1 of the pair of supporting swing rods 2 on the left, to provide certain support to the hinge point of the pair of supporting swing rods 2; therefore, the vertical critical state will not be destroyed by ordinary slight sways.

In case the vehicle body decelerates vehemently, the mass block will move in the vehicle travelling direction under the action of inertial effect. As shown in FIG. 1B, the mass block 6 moves towards right and impacts the hinged knuckle point a1 of the pair of supporting swing rods 2 on the right, causing the first included angle $\alpha 1$ at the hinge point of the upper and lower supporting swing rods 2 reduced to a second included angle $\alpha 2$. Consequently, the lower end of the supporting swing rods 2 is pulled up immediately from position P1 to position P2 (shown in FIG. 1), creating a clearance 8 between the two positions; hence, the pressure applied on the seat belt is changed.

The structure described in the above description is the basic structure of the present invention, which can be applied in a variety of ways, as detailed hereunder.

Embodiment 1

Hereunder the seat belt adjuster in a first embodiment of the present invention will be described.

the first embodiment can achieve the main following functions.

1) After the occupant holds the seat belt bolt, overrides the retracting force of the retractor, and pulls out the seat belt from the retractor to required pulling length and stops pulling, the appropriate tightness can be maintained by means of the adjuster by restraining the seat belt from retracting. In addition, the occupant can pull the seat belt further as required, so as to adjust the seat belt to a desirable degree of looseness.

2) In case the vehicle decelerates abruptly and the deceleration exceeds a preset safety limit due to causes such as crashing, the loose part of the seat belt will be taken back by the retractor.

3) After the use, when the seat belt bolt is pulled out from the buckle, the seat belt will fall off, and the part of seat belt pulled out from the retractor will be fully retracted into the retractor.

FIG. 3-7 are schematic diagrams of overall structure of the first embodiment of the adjuster in the present invention.

In the first embodiment, the adjuster comprises: four supporting swing rods 2, which form a parallelogrammic link mechanism as described above; an interlock rod 10, which synchronizes the two pairs of supporting swing rods on the left and right; a suspension frame 25, with a movable channel 7 formed in the middle part to accommodate a mass object 6, with the left and right lower ends fixedly connected directly to two connection points 1; a retraction-restraining press block 13, which is fixedly connected directly to the lower end of the suspension frame 25, and arranged between the two connection points 1 at the bottom of the left and right supporting swing rods 2; an eccentric roller 12, which is arranged below the retraction-restraining press block 13 and facing the retraction-restraining press block 13; a movable bracket 16 (shown in FIG. 5), wherein, the left and right upper ends of the movable bracket 16 are connected to the two connection points 1, the suspension frame 25 is pivotally suspended at the upper end of the movable bracket 16, and the movable bracket 16 is positioned by a supporting reed 15 and a positioning spring 21 (shown in FIG. 7); a frame seat 26, wherein, the movable bracket 16 is pivotally connected to the frame seat 26 via a shaft rod 17 (shown in FIG. 5); a connecting snap spring retainer 18, designed to connect the seat belt adjuster to the vehicle body; and an angle-adjustable soleplate 20 (shown in FIG. 7), wherein, the inertial triggering sensitivity of the mass block can be changed by adjusting the horizontal tilt angle of the soleplate 20.

When installed, the adjuster in the present invention is located in a suspender 1103 on a pillar of the vehicle body. As shown in FIG. 18, the shoulder belt 1102 extends upwards from the lower fixing unit 1106 beside the lower part of the seat, through the clearance between the retraction-restraining press block 13 and the eccentric roller 12, and falls off naturally when it is not used, or is pulled out so that the locking bolt 1104 can be wedged into the locking body 1105 when it is used.

Figure 9:
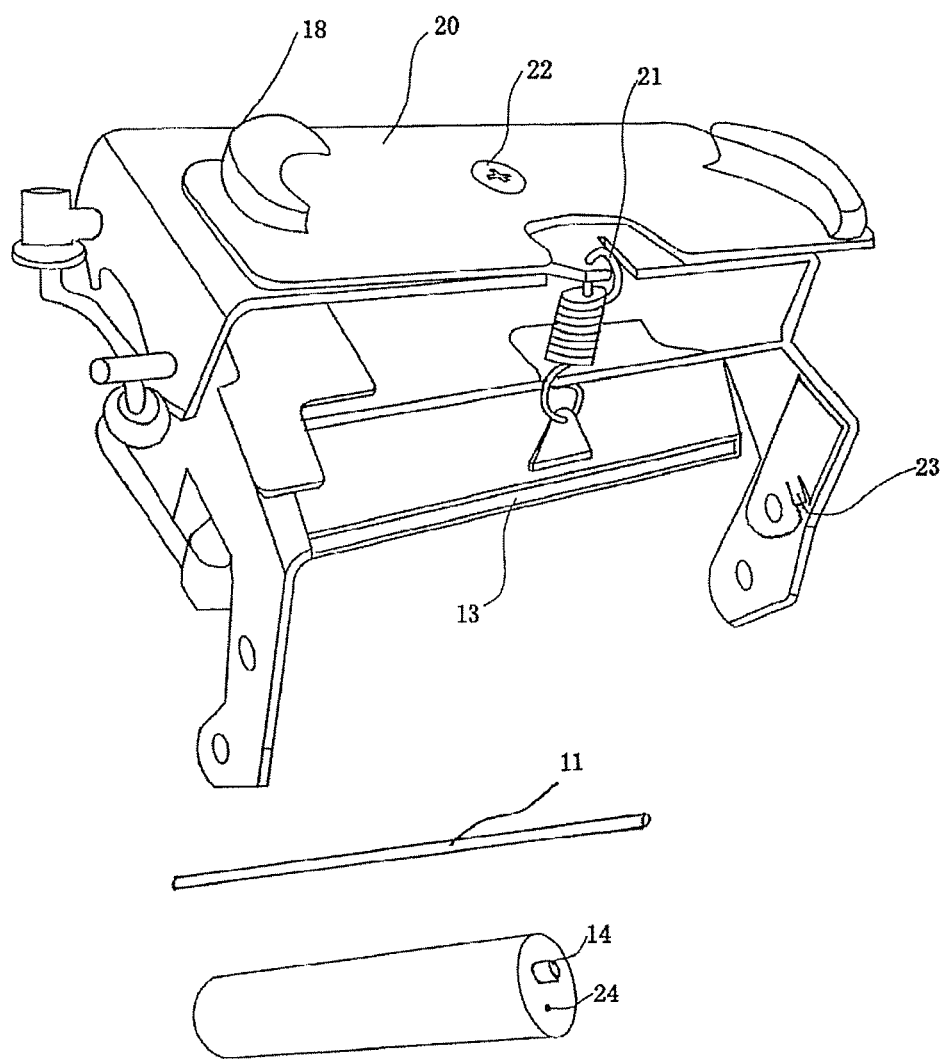
FIG. 9 is a rear perspective view of the adjuster in the first embodiment of the invention, with the eccentric roller shaft removed.
Figure 10:
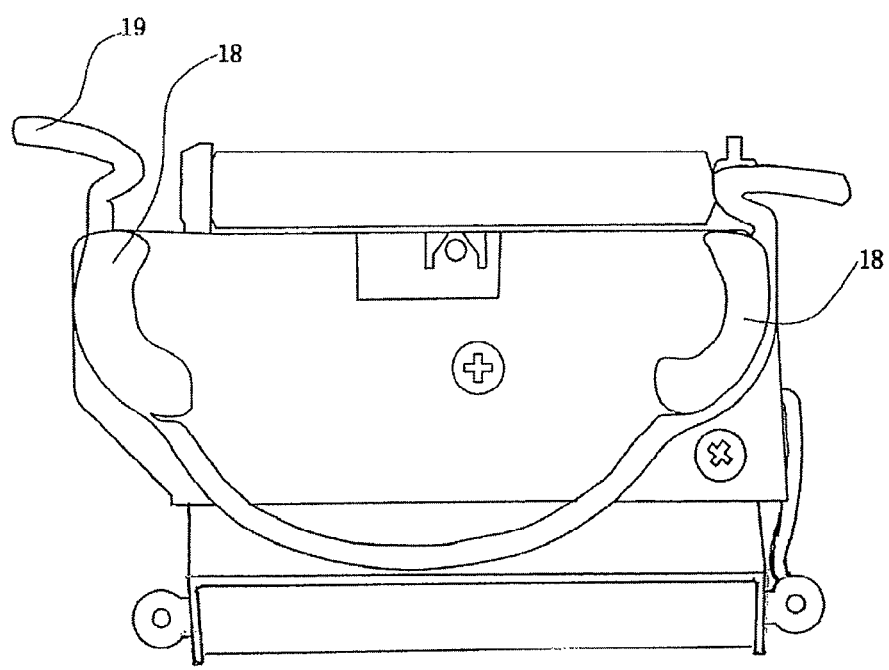
FIG. 10 is a rear view of the adjuster in the first embodiment of the present invention.
Figure 11:
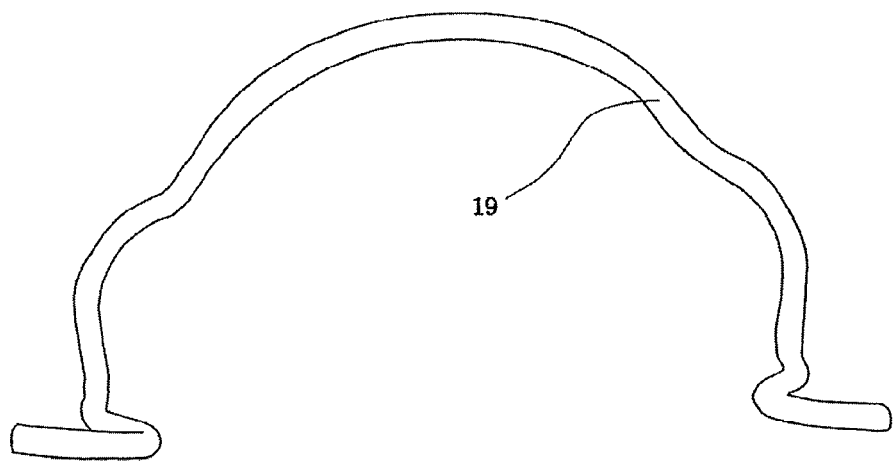
FIG. 11 is a schematic diagram of a suspension snap spring in the first embodiment of the present invention.
Figure 12:
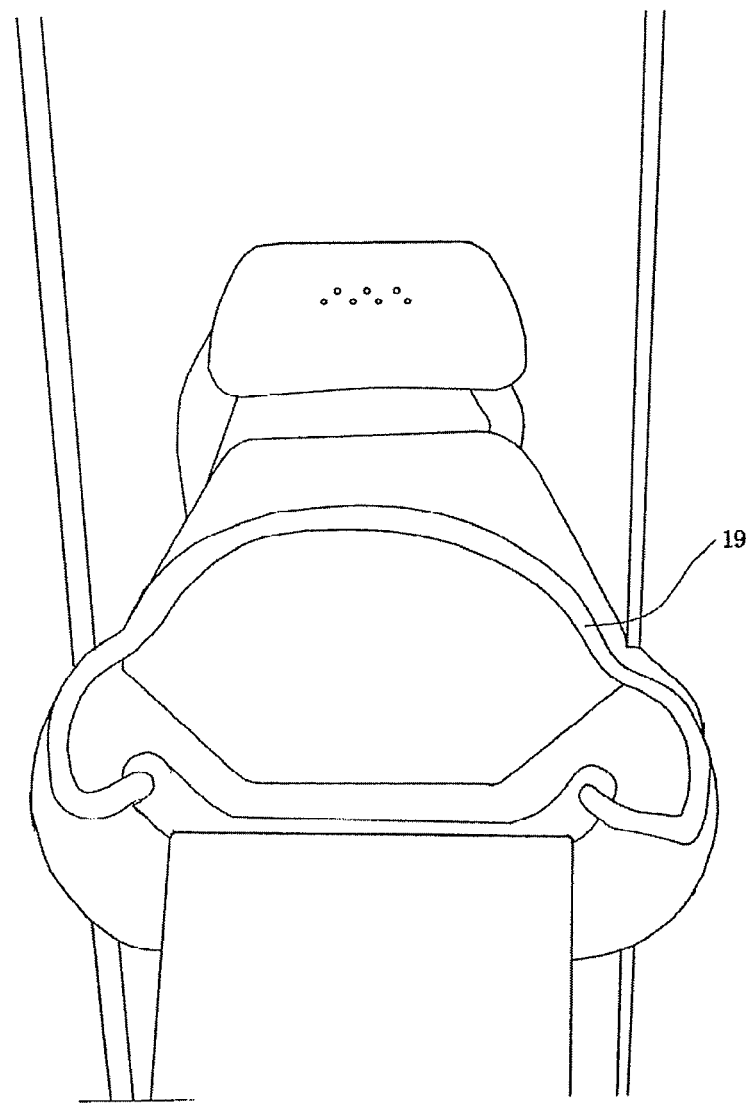
FIG. 12 is a schematic installation diagram of the suspension snap spring in the first embodiment of the present invention.
Figure 13:
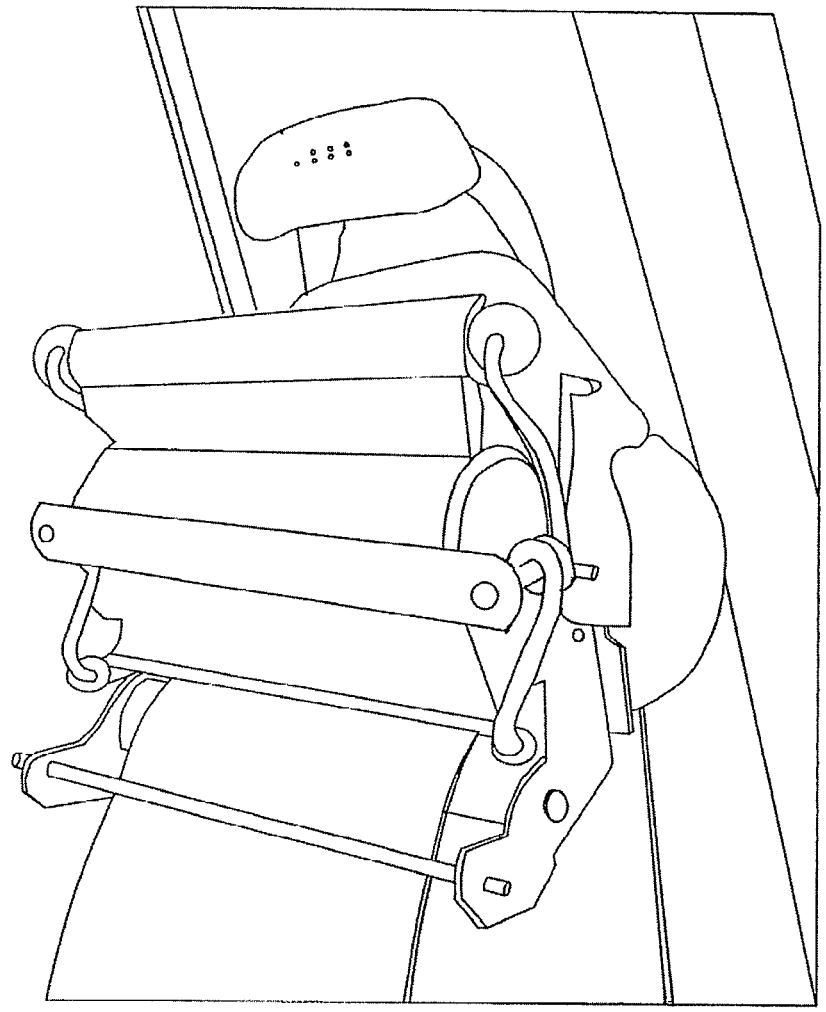
FIG. 13 is a schematic diagram of the adjuster in the first embodiment of the present invention, after the adjuster is mounted on a vehicle seat belt apparatus.

In use, when the driver takes the seat and pulls the seat belt, the seat belt will lift up the suspension frame 25, and thereby drives the retraction-restraining press block 13 that is fixedly connected directly to the lower end of the suspension frame 25 to lift up, resulting in increased clearance between the retraction-restraining press block 13 and the eccentric roller 12, so that the seat belt passes through the wider clearance easily. At the same time, the pulled seat belt drives the eccentric roller 12 to roll around the roller shaft 14 under the action of friction force. When the eccentric roller 12 rolls to the maximum eccentric position, the positioning ratchet reed 23 fixed to the movable bracket 16 will be engaged to the positioning ratchet 24 fixed to the eccentric roller 12, as shown in FIG. 9. At that moment, the rolling action of the eccentric roller 12 is stopped, and the retraction-restraining press block 13 and the eccentric roller 12 are at positions that offer a maximum clearance for the safety belt to pass through. After that, though the driver can pull the seat belt further, the eccentric roller 12 will no longer roll.

When the driver stops the pulling action, the seat belt will become slack, the suspension frame 25 will fall down, and the retraction-restraining press block 13 will fall down accordingly and return to the position facing the eccentric roller 12. At the same time, under the retracting force of the seat belt retractor, the seat belt begins the retraction action; thus, the eccentric roller 12 is driven to roll in the reversed direction under the action of friction force, and finally reaches to a position where the clearance between the eccentric roller 12 and the retraction-restraining press block 13 is minimum. At that position, the retracting seat belt is seized, and thereby the seat belt tightness adjusted previously is maintained. Since the eccentric roller 12 has a very small diameter, the seat belt retraction length is small; hence, the seat belt tightness adjusted previously is well kept. After that, if the occupant pulls the seat belt again, the process described above will be repeated.

In the normally driving process, the pairs of supporting swing rods 2 are essentially aligned in the vertical direction, and therefore exert great vertical supporting force on the retraction-restraining press block 13, keeping the retraction-restraining press block 13 at a position P1 (shown in FIGS. 1A and 2A) where the seat belt is clamped by the retraction-restraining press block 13 and the eccentric roller 12 together.

When the vehicle brakes and decelerates, as shown in FIG. 1B, the mass object 6 will move in the vehicle traveling direction under the action of inertial force, and impact the hinged knuckle point a1 of the pair of supporting swing rods 2, causing the first included angle α1 at the hinge point of the upper and lower supporting swing rods 2 decreased. Consequently, the lower end of the suspension frame 25 is pulled up by the supporting swing rods 2, and the retraction-restraining press block 13 is driven upwards by the suspension frame 25 to a position P2 (shown in FIG. 1B); hence, a wide clearance 8 is created, and the seat belt is retracted upwards and tensioned up under the retracting force of the retractor. Here, the retractor in the present invention always provides high retracting force, so as to achieve rapid pre-tensioning before any accident.

Figure 8:
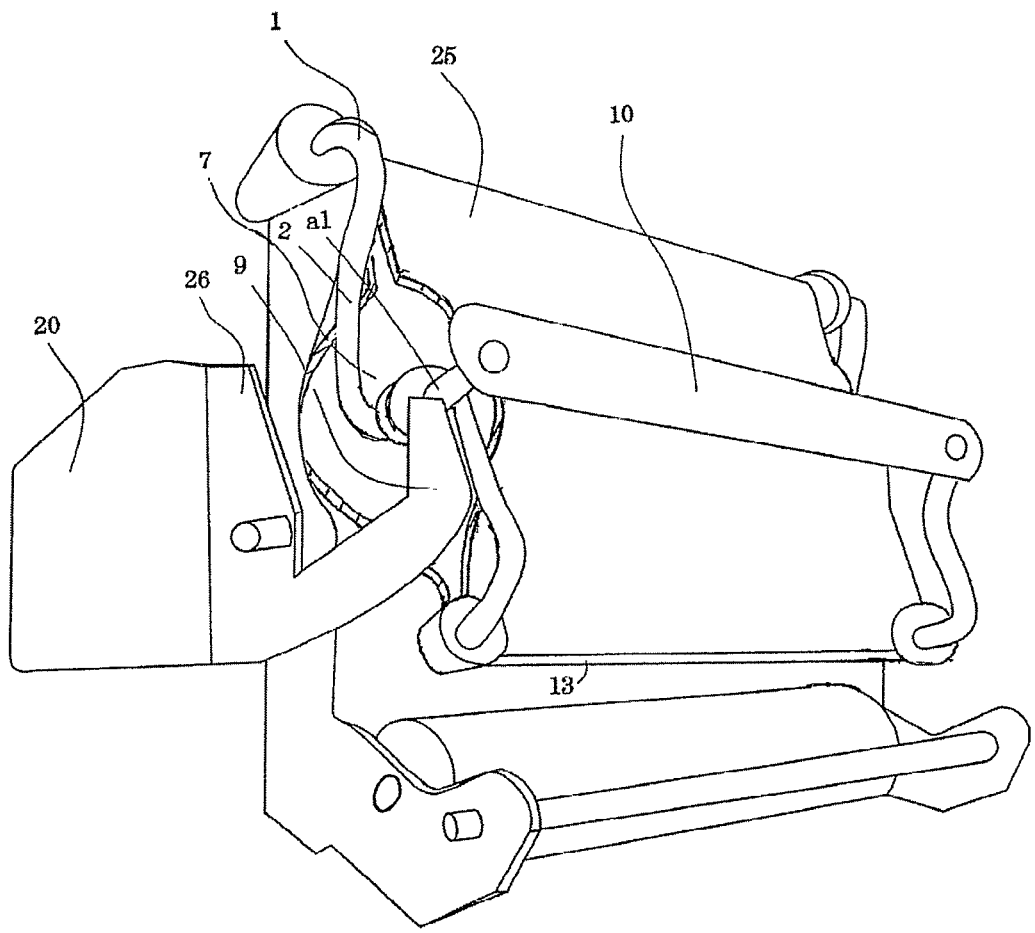
FIG. 8 is a left perspective view of the adjuster in the first embodiment of the present invention, illustrating a state that the seat belt is retracted by a retractor when the clearance between a retraction-restraining press block 13 and an eccentric roller 12 is completely opened after the seat belt is used.

When the seat belt is not used, the shoulder belt that spanned in front of the occupant body originally is released and suspended at the side door pillar. Owing to the angular change of seat belt and the gravitational action, the movable bracket 16 overrides the supporting force of the rear supporting reed 15 and turns downwards and backwards, and drives the suspension frame 25 to turn together, so that the retraction triggering block 9 connected to the frame seat 26 triggers the knuckle point a1 of the supporting swing rods, as shown in FIG. 8; thus, the supporting swing rods 2 are relieved from the vertical critical state, i.e., the vertical supporting force exerted by the supporting swing rods 2 on the retraction-restraining press block 13 is eliminated, similar to the case of deceleration. Now, as the supporting force is lost, the retraction-restraining press block 13 is driven by the suspension frame 25 to move up, and consequently, the clearance between the retraction-restraining press block 13 and the eccentric roller 12 is increased. Under the retracting force of the seat belt retractor, the excessive pull-out part of the seat belt is retracted into the vehicle body. In addition, at the beginning of use, if the pull-out length of seat belt is excessive, the excessive pull-out part can be retracted into the vehicle body in the manner described above, as the seat belt becomes slack and sags.

The inertial triggering sensitivity of the mass block is adjustable. In this embodiment, the inertial triggering sensitivity of the mass block can be adjusted by adjusting the horizontal tilt angle of the frame seat 26. After the adjustment, the frame seat 26 is fixed to a door pillar of vehicle body. By adjusting the horizontal tilt angle of the frame seat 26, the seat belt provided in the present invention can be pre-tensioned at different decelerations (e.g., emergency braking from 30 Km/h or 50 Km/h vehicle speed), so as to attain the pre-tensioning object.

Embodiment 2

Figure 14:
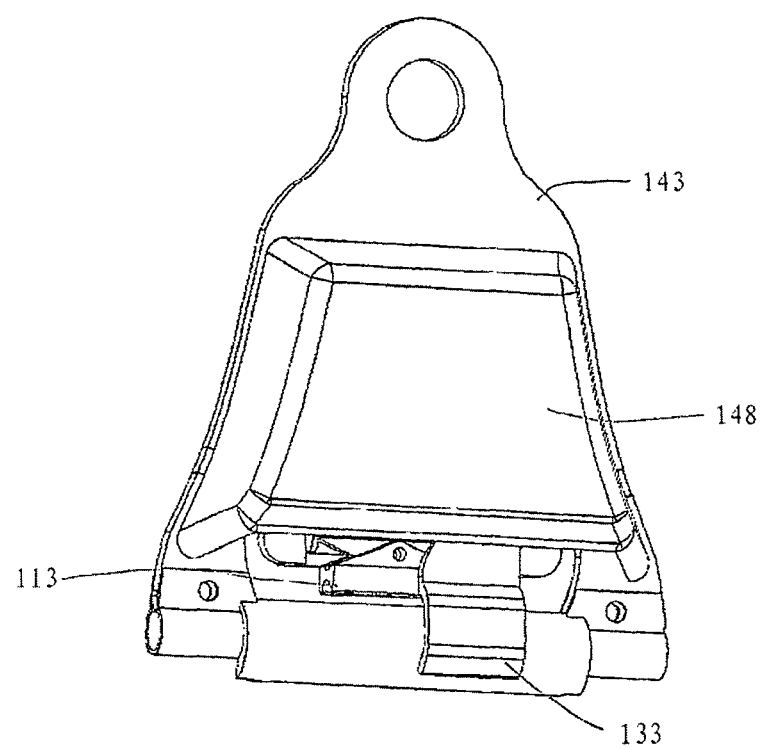
FIG. 14 is a schematic diagram of the overall structure of the adjuster in a second embodiment of the present invention.
Figure 15:
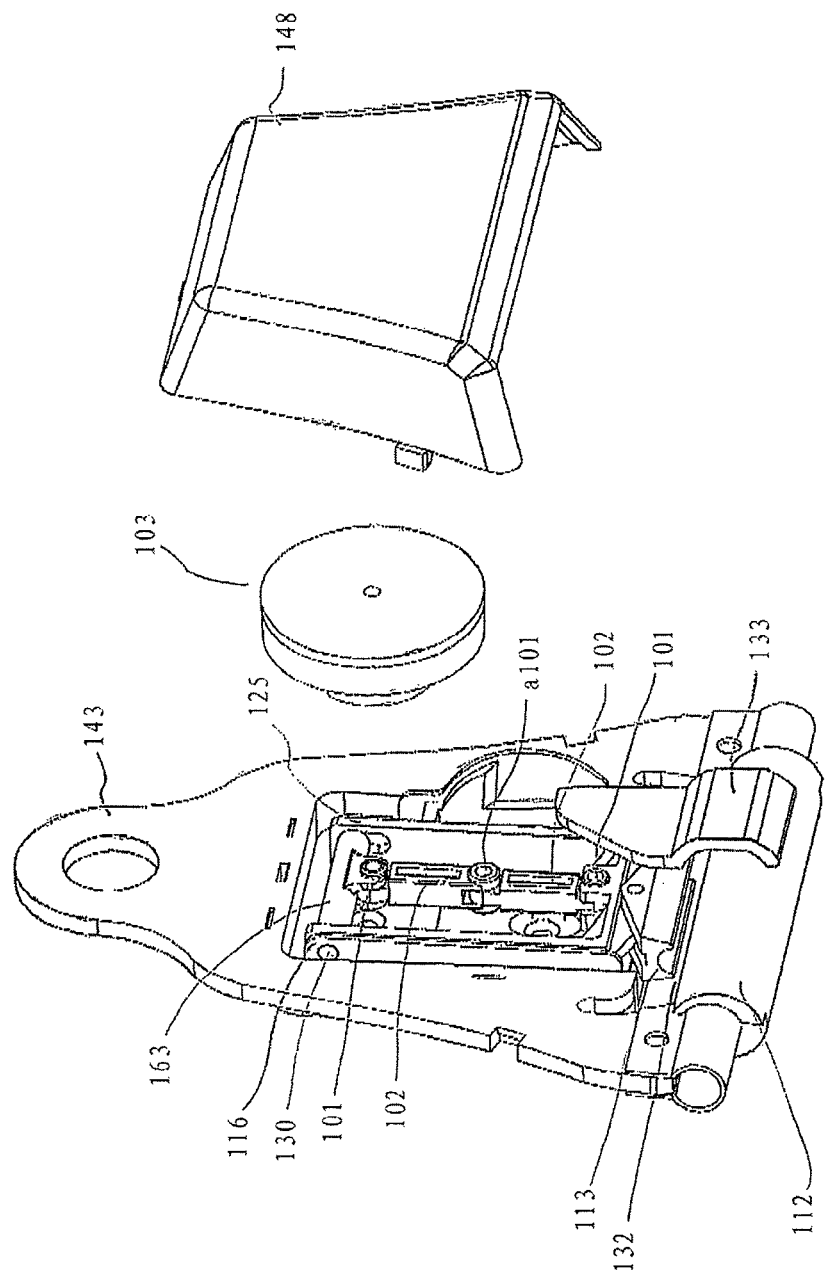
FIG. 15 is a schematic diagram of the internal structure of the adjuster in the second embodiment of the present invention, with the enclosure removed.
Figure 16:
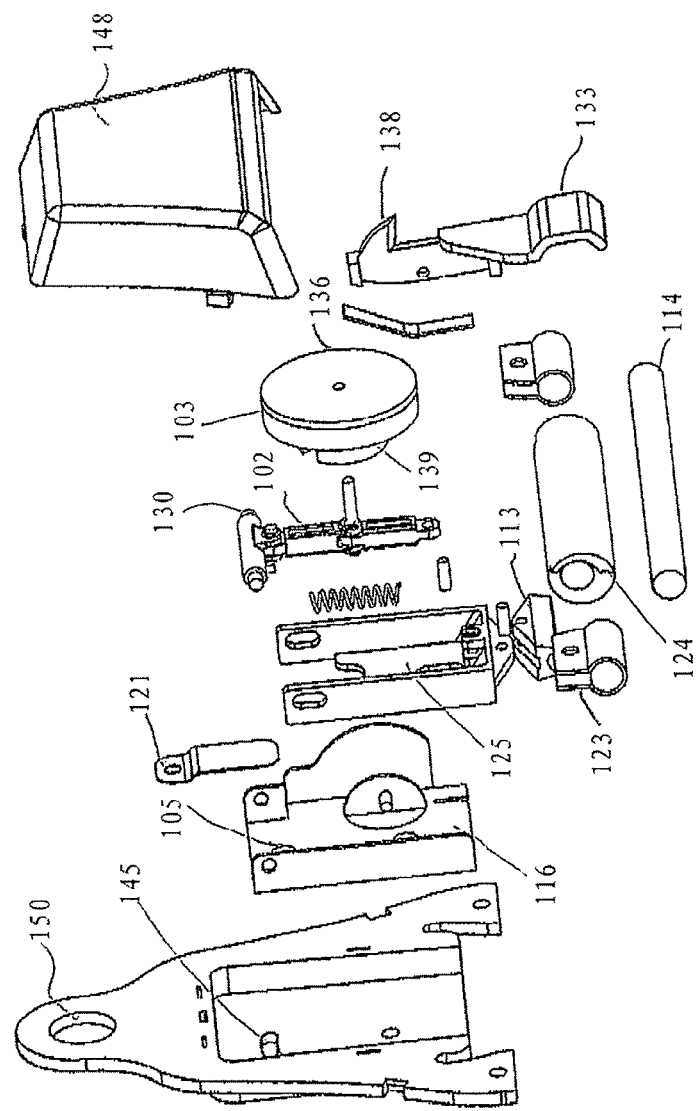
FIG. 16 is a schematic diagram of the components of the adjuster in the second embodiment of the present invention.
Figure 17:
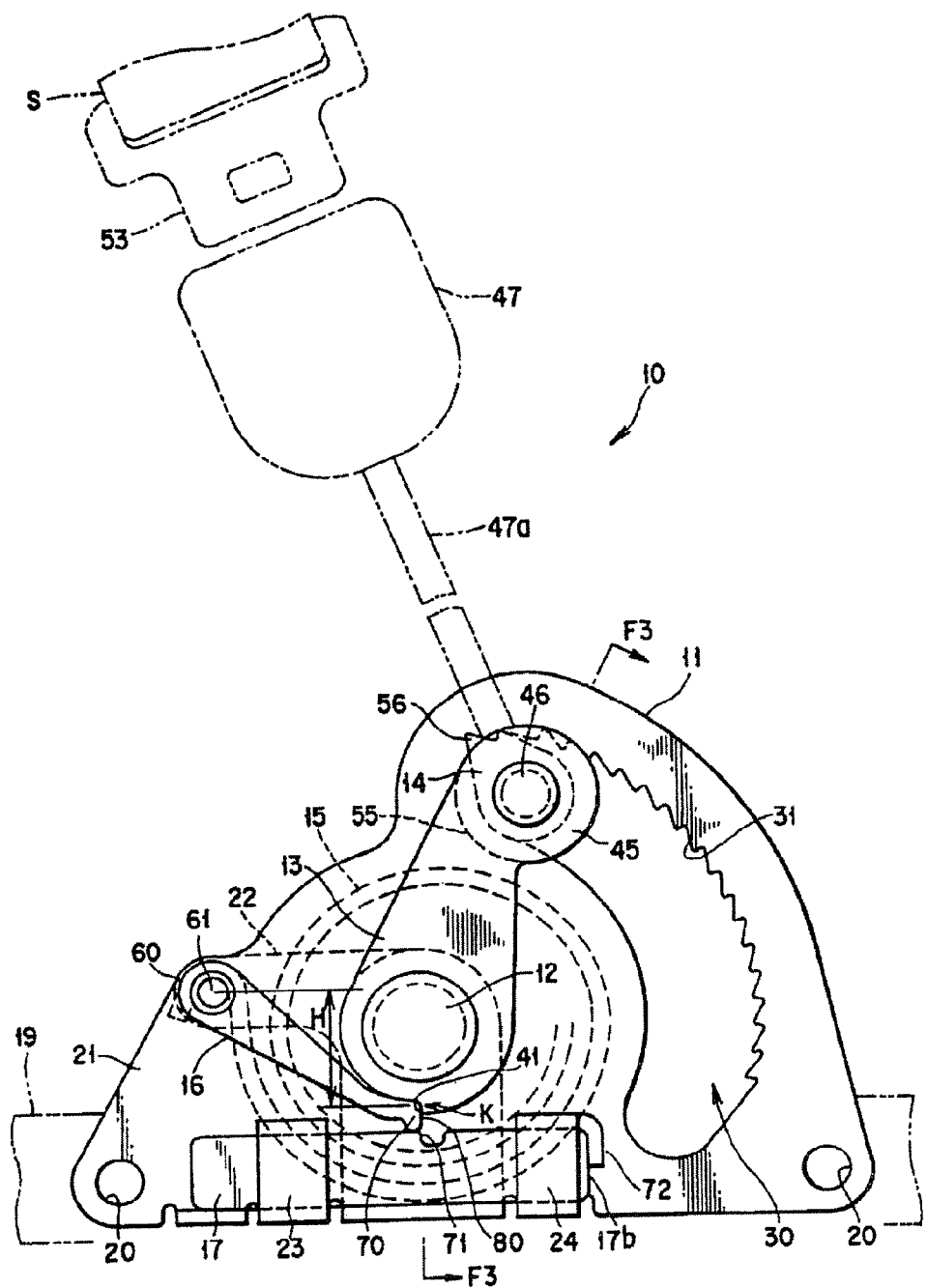
FIG. 17 is a schematic diagram of a seat belt pre-tensioner in the prior art.

In a second embodiment of the present invention, another seat belt adjuster is provided. As shown in FIG. 14-16, the difference of the second embodiment from the first embodiment lies in: in the second embodiment, one pair of supporting swing rods is used instead of two pairs of supporting swing rods, and the mass object is directly mounted at the hinge point of the supporting swing rods; in addition, a separate sensing rod is designed to sense the angular and weight change of the seat belt. Therefore, the adjuster in the second embodiment is more compact in construction, smaller in size, and more responsive to retraction demand.

The adjuster in the second embodiment comprises: a pair of supporting swing rods 102, with a mass object 103 mounted at a hinge point a101 of the rod ends; a suspension frame 125, which supports the pair of supporting swing rods 102, wherein, a suspension shaft 130 passes through a slotted hole on the upper end of the suspension frame 125, and the suspension frame 125 can override spring force and thereby moves up or down in the slotted hole in relation to the suspension shaft 130 as the external force varies; a retraction-restraining press block 113, which is fixedly connected directly to the lower end of the suspension frame 125; an eccentric roller 112, which is arranged below the retraction-restraining press block 113 and facing the retraction-restraining press block 113; and an adjustable suspension frame seat 116, which is mounted in a stationary state, wherein, the suspension shaft 130 is fixed to the upper side of the frame seat 116, so that the suspension frame 125 is pivotally suspended at the upper end of the frame seat 116. The critical position and maximum sway span of the hinged supporting swing rods 102 and the knuckle point a101 of the supporting swing rods are defined by a limiting tab 139 on the mass object 103 and the side walls of the adjustable suspension frame seat 116.

When installed, the adjuster in the present invention is located in a suspender 1103 on a pillar of the vehicle body. As shown in FIG. 18, the shoulder belt 1102 extends upwards from the lower fixing unit 1106 beside the lower part of the seat, through the clearance 132 between the retraction-restraining press block 113 and the eccentric roller 112. The retraction-restraining press block 113 and the eccentric roller 112 are in linear contact with each other, and the extension of the contact line is in parallel to the vehicle body moving direction.

When the seat belt is pulled, the suspension frame 125 will be driven by the pulled seat belt to slightly pivot and override the spring force to move up in the slotted hole, and thereby will be slightly lifted upwards, leaving a wide clearance for the seat belt to pass through; at the same time, the pulled seat belt drives the eccentric roller 112 to roll under the action of friction force; when the eccentric roller 112 rolls to a maximum eccentric position, it will be stopped by a ratchet stop boss 123 and a ratchet 124, so that the pulled seat belt can pass through a wider clearance.

When the pulling action is stopped, the suspension frame 125 will fall down, and the eccentric roller 112 will roll in reversed direction under the action of retracting force of the seat belt retractor, and return to the minimum clearance position, till the retracted seat belt is restrained. At that time, the occupant obtains a loose and comfortable feel, and is not over-restrained by the seat belt.

When the vehicle brakes and the deceleration reaches to a specific limit, the mass object 103 will move forwards under the action of inertial effect, drive the knuckle point a101 of the hinged supporting swing rods 102 that are in vertical critical state, and thereby eliminate the vertical supporting force exerted by the hinged supporting swing rods 102 on the retraction-restraining press block 113; as the supporting force is lost, the retraction-restraining press block 113 moves up, and the seat belt is retracted accordingly, so that the slack part of the seat belt is retracted back.

The inertial triggering sensitivity of the mass block is adjusted by adjusting the horizontal inclination of the entire assembly.

When the seat belt is not used, the seat belt that spanned in front of the occupant body originally at a specific angle is suspended vertically at a side door pillar. Thereby, the angle sensing rod 133 turns downwards under the spring force of a spring plate, and a bulged part 138 of the angle sensing rod pushes a contact 136 on the mass object, so that the mass object destroys the supporting state of the supporting swing rods, and all pull-out part of the seat belt is retracted into the retractor under retracting force.

Compared to the prior art, the present invention has the following advantages.

Firstly, the supporting swing rods 2 are aligned vertically. In addition, the supporting swing rods 2, retraction-restraining press block 13, and shaft 14 of eccentric roller 12 are essentially in the same plane, and the extension line of the vertically aligned supporting swing rods 2 is perpendicular to the contact position between the retraction-restraining press block 13 and the eccentric roller 12, exhibiting an inverted "T" shape. Thus, when the supporting swing rods 2 are essentially vertically aligned, the supporting force exerted by the supporting swing rods 2 on the retraction-restraining press block 13 will exert maximum pressure on the seat belt between the retraction-restraining press block 13 and the eccentric roller 12. Such supporting force will be changed only by the quantity of inertial force pointing to the vehicle head direction resulted from deceleration.

Secondly, in the present invention, the state transition of the supporting swing rods 2 between vertically aligned state and non-vertically aligned state happens in the same plane, which is in parallel to the vehicle traveling direction. Therefore, the entire assembly can be arranged in a flat layout at one side in the vehicle body, and occupies a very small space.

Thirdly, theoretically, the supporting force provided by the adjuster in the present invention only depends on the rigidity of the rods and the supporting structure for the rods, and doesn't have high requirement for the design and manufacturing, which is to say, great supporting force can be achieved easily. In contrast, the vertically aligned state of the supporting swing rods 2 can be destroyed and changed easily as long as small force is exerted on the supporting swing rods 2. Such a force contrast is similar to the lever effect, i.e., only tiny force is required to destroy great supporting force. In addition, the structure is responsive and reliable. That feature is the biggest advantage of the present invention. With a simple and compact structure, the adjuster provided in the present invention implements a seat belt adjuster that is highly responsive and reliable, and can provide great supporting force. Moreover, the adjuster doesn't need any structure that is complex and has limited reliability, such as electronics, pyrotechnic devices, or ratchet locking mechanisms, etc., so the adjuster provided in the present invention requires lower cost while attaining satisfactory reliability.

In addition, in the embodiments described above, tests have shown that the adjuster provided in the present invention applies 0-0.1 lb. pressure on the occupant body under normal service conditions, including the pressure resulted from the weight of the seat belt. In comparison, existing seat belts apply much higher pressure on the occupant body, even as high as 0.5 lb. Therefore, in normal use, existing seat belts may cause uncomfortable feel and therefore may be abandoned by the occupant. In the present invention, in normal use, the seat belt can be adjusted easily to an appropriate position to minimize the pressure on the occupant; whereas, in case of any emergency, the restrainment on the seat belt will be released and the pressure will be increased. It should be noted: in the embodiments described above, since the seat belt is not locked up in the event of any crash, the seat belt itself can provide enough retracting force to restrain the occupant firmly in the seat in the event of a crash. Thus, with a simple and reliable mechanical structure, the present invention improves service comfortability and safety of seat belt.

Moreover, in the present invention, both the seat belt restrainment and the releasing of restrainment are implemented with the same swing rod supporting mechanism. Therefore, the required components are fewer, and the structure is simple.

The above embodiments are provided only for illustration purpose. The components are not limited to the configuration or connected relations described in the embodiments of the present invention. Those skilled in the art can seek for suitable configurations in conventional mechanical constructions. For example, variations can be made as follows.

1. The main ideal of the above embodiments is: when the seat belt is used normally by an occupant, the supporting swing rods 2 are vertically aligned, so that the clearance between the restraining press block 13 and the eccentric roller 12 is reduced, and the seat belt is kept at appropriate tightness and is restrained from retracting; in case of any emergency, the vertically aligned state of the supporting swing rods 2 is destroyed, and the clearance is increased, so that the restrainment on the seat belt is released, and the seat belt is further tensioned up by the retractor; thus, the demand for specific tightness of seat belt in different situations can be met.

However, the applicability of the present invention is not limited to the application described above. It can also be used reversely as an emergency locking apparatus. That is to say, when the seat belt is used normally by the occupant, the clearance is increased and the seat belt is not restrained; whereas, in case of any emergency, the clearance is reduced, and the seat belt is restrained from pulled out further. For example, the eccentric roller 12 can be arranged above the restraining press block 13; in that way, when the supporting swing rods 2 are in vertically aligned state, a wide clearance is kept, and the retractor maintains appropriate tightness of the seat belt; whereas, in case of any emergency, the supporting swing rods 2 are no longer vertically aligned, and therefore the clearance is reduced, and the seat belt is restrained from pulled out further.

Compared to existing emergency locking apparatuses, such an emergency locking apparatus still has advantages such as simple structure and high reliability, etc.

Figure 4:
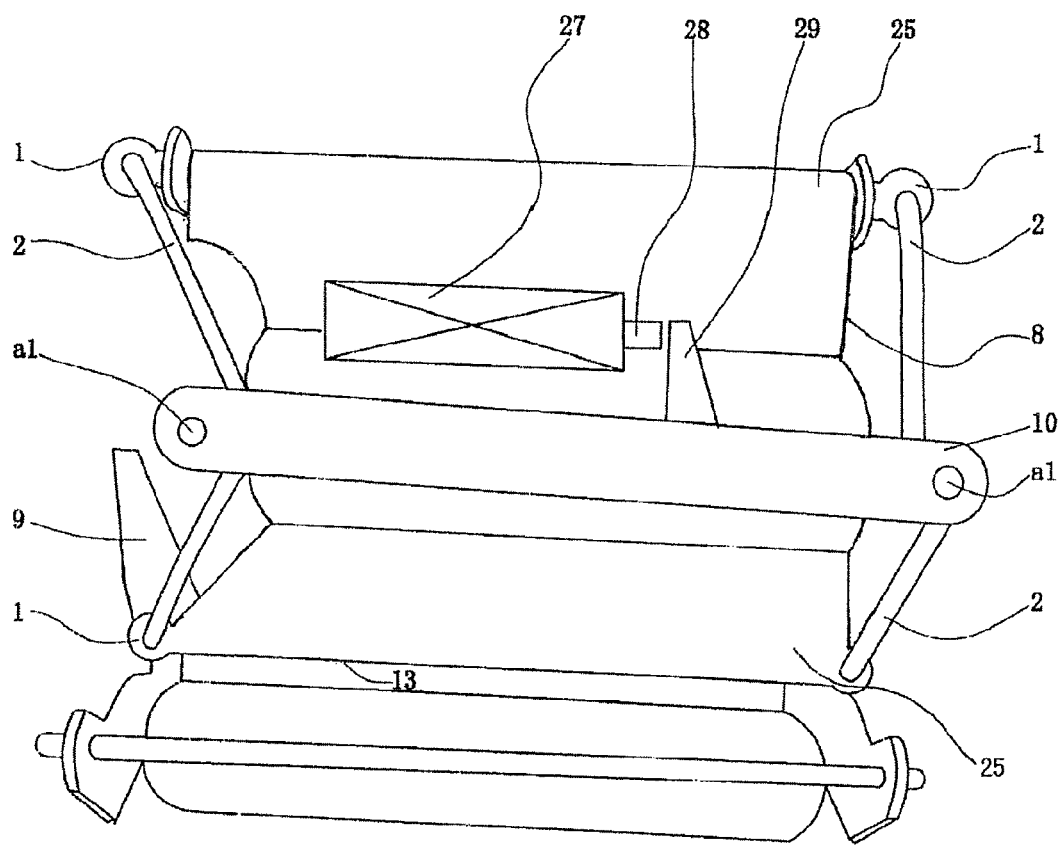
FIG. 4 is a schematic structural diagram of the adjuster in the first embodiment of the present invention, in a state that the adjuster releases the restrainment on the seat belt so that the seat belt is tensioned up by the retractor in an emergent situation, wherein, the outer-side enclosure of a suspension frame 25 is removed to expose a micro-switch.
Figure 5:
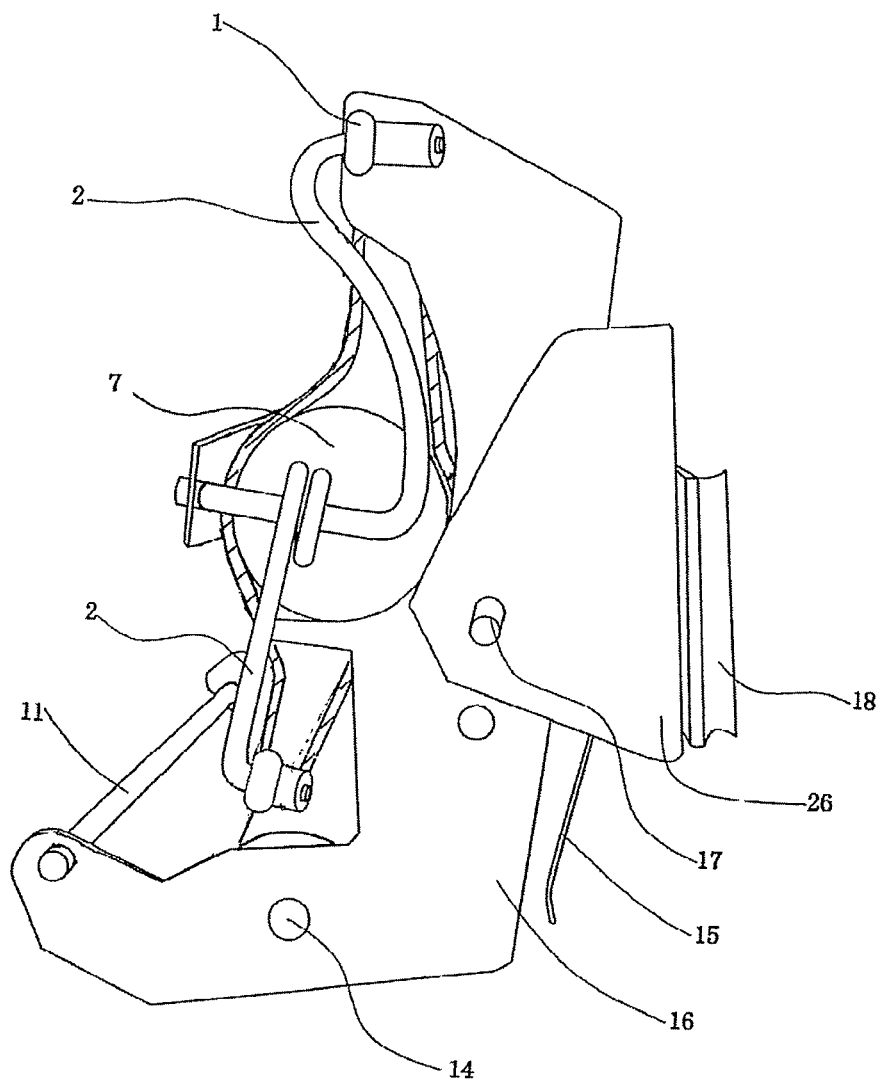
FIG. 5 is a right view of the adjuster in the first embodiment of the present invention.
Figure 6:
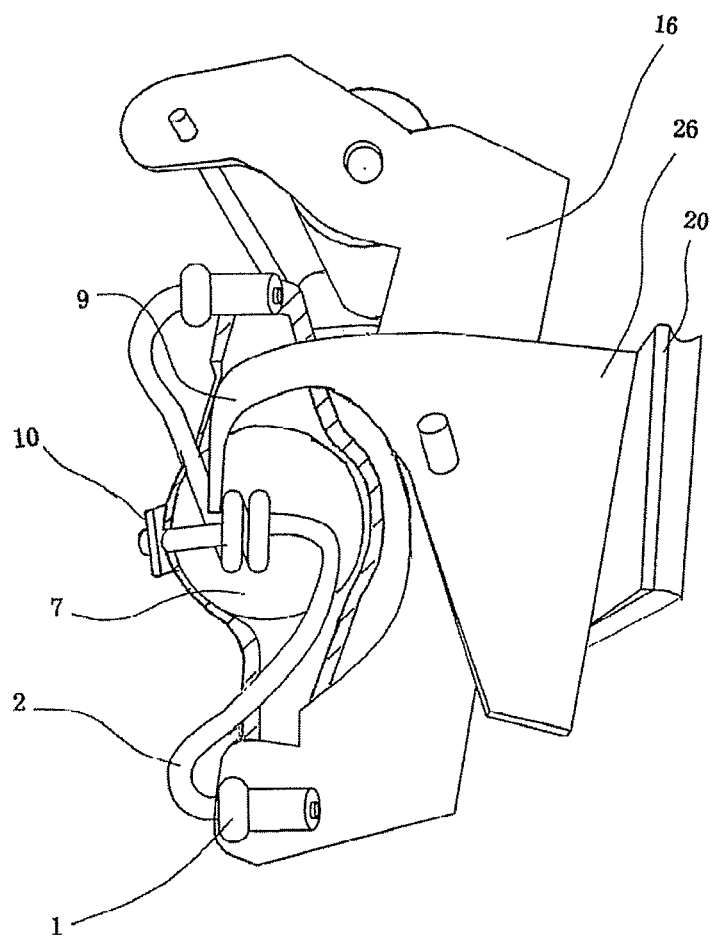
FIG. 6 is a left view of the adjuster in the first embodiment of the present invention.
Figure 7:
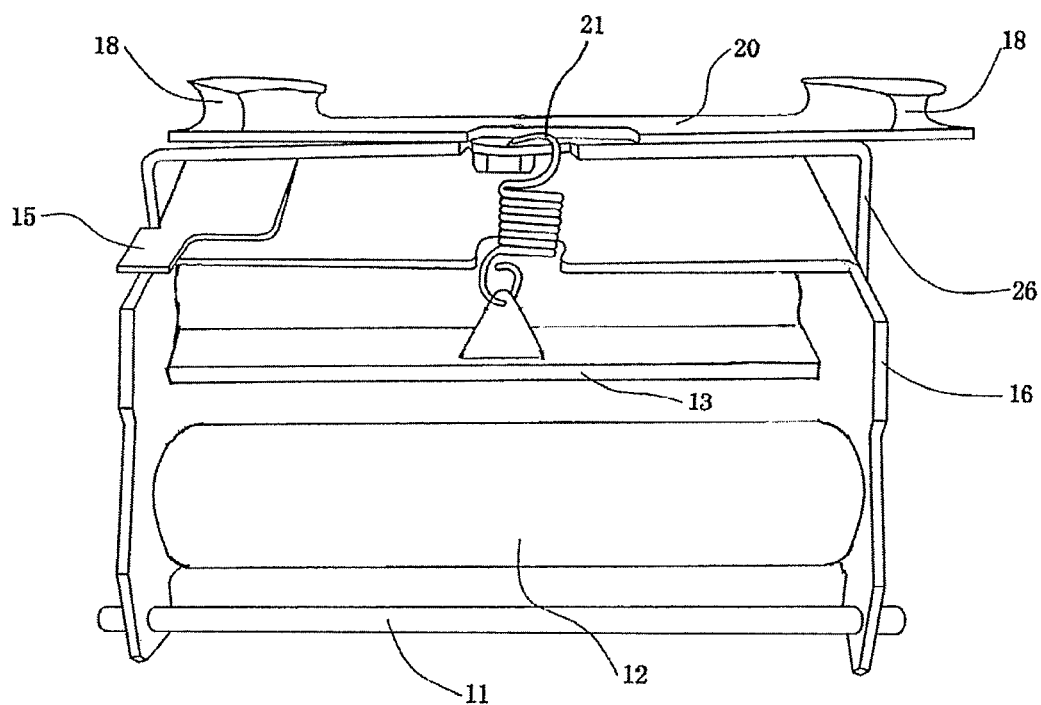
FIG. 7 is a bottom view of the adjuster in the first embodiment of the present invention.

2. Replacement of inertial mechanism: the technical ideal described above can be implemented by utilizing an electro-dynamic component to provide a signal to initiate the hinge point of the supporting swing rods. For example, a ranging radar can be used in the present invention. In case of any accident, the ranging radar will provide a signal to initiate the hinge point of the supporting swing rods, so that the slack part of seat belt will be retracted by the retractor. As shown in FIG. 4, An electric micro-switch 27 is triggered by the signal from the ranging radar, the contact 28 on the switch pushes the contact 29 of an interlock rod, and eliminates the supporting force on the retraction-restraining press block 13 when the hinged supporting swing rods are in vertical critical state, so that the retraction-restraining press block 13 is lifted up by the retracting force on the seat belt, and the retractor retracts and tensions up the slack seat belt.

With an electro-dynamic triggering mechanism, the action can be taken before the vehicle body decelerates. Therefore, the seat belt will be more responsive.

3. The seat belt adjuster provided in the present invention can be arranged at any position where it can directly act on the strap.

In the embodiments described above, the seat belt adjuster provided in the present invention is mounted in the upper suspender 1103. However, the seat belt adjuster can be mounted in the lower fixing unit 1106 instead. The seat belt adjuster in the present invention can be arranged at any position, as long as the seat belt adjuster can come in contact with thestrap. However, the zone A from the upper suspender 1103 to the lower fixing unit 1106 is preferable.

Such arrangement way of the adjuster can apply force more directly on thestrap, and the occupied space will be small but the force exerted can be great. Thus, the service reliability can be ensured.

4. The adjuster in the present invention can be used as a separate component and connected via connecting components in vehicles that don't have such a function yet. In that case, a retracting force enhancement device can be added into the seat belt apparatus described in the present invention. Or, the adjuster can be directly engineered and mounted in new vehicles. In that case, the retracting force provided by the vehicle body can be enhanced appropriately. Thus, the application of the adjuster will be more reasonable, convenient, safe, and comfortable.

5. In above embodiments, the included angle between the swing rods is changed by exerting force to the hinge point of the swing rods, where the force required to change the included angle is minimum. However, those skilled in the art can conceive any solutions of exerting force on the first swing rod and/or the second swing rod and/or the hinge point of the swing rods, as long as the included angle between the swing rods can be changed.

The above embodiments are provided only to illustrate the technical solutions of the present invention, but shall not be interpreted as limiting to the present invention. It should be appreciated that various modifications can be made to the technical solutions described in above embodiments, or equivalent replacements can be made to some technical features thereof, without departing from the spirit and scope of the technical solutions described in the embodiments of the present invention.

The invention claimed is:

1. A seat belt adjuster for a seat belt in a vehicle, the seat belt adjuster comprising:
a pair of supporting swing rods including a first swing rod and a second swing rod with adjacent ends of the first and second swing rods hinged together and forming an included angle between the swing rods, where either non-adjacent end of the first or second swing rods is fixed in stationary state, and the other non-adjacent end of the first or second swing rods is movable as the included angle between the swing rods changes and configured to control locking and releasing of a strap of the seat belt by changing of a distance between the non-adjacent ends of the first and second swing rods; and
an actuator configured to change the included angle between the swing rods by exerting force to the first swing rod and/or the second swing rod and/or a hinge point of the swing rods, and thereby apply a variable force directly on the strap of the seat belt via the other non-adjacent end, wherein when the first and second swing rods are in a 180-degree vertically aligned state, the other non-adjacent end can provide full supporting force perpendicularly on the strap of the seat belt, and thereby lock the strap of the seat belt to restrain the strap from moving, and, when the included angle between the swing rods is changed via an actuator under action of small signaling force, the other non-adjacent end releases the strap of the seat belt; and wherein the actuator comprises a mass object, and is configured to change the included angle between the swing rods automatically under an inertial effect of the mass object.

2. The adjuster as set forth in claim 1, wherein, once deceleration of the vehicle exceeds a preset safety limit, the other non-adjacent end automatically unlocks the strap of the seat belt, so that a seat belt retractor tensions up the strap of the seat belt and restrains an occupant secured by the seat belt.

3. The adjuster as set forth in claim 2, wherein, during normal use, the other non-adjacent end locks up the strap of the seat belt in a position of required pull-out length.

4. The adjuster as set forth in claim 1, wherein, the actuator exerts force to the hinge point of the swing rods.

5. The adjuster as set forth in claim 1,
wherein, the seat belt comprises a suspender that is suspended on a support pillar and configured to fix an upper end of the strap of the seat belt nearby a shoulder of an occupant, and a retractor that is arranged near a lower part of seat in the vehicle at a side of the seat and configured to retract the strap of the seat belt inwards and wherein the adjuster is arranged at any position between the suspender and the retractor, so as to act directly on the strap of the seat belt.

6. The adjuster as set forth in claim 1, wherein, the actuator comprises an electro-dynamic component, configured to change the included angle between the swing rods automatically in response to a control signal.

7. The adjuster as set forth in claim 1, further comprising a sensing component configured to sense any angular change of the strap of the seat belt resulted from tension change of the strap of the seat belt, and thereby adjust the included angle between the swing rods.

* * * * *